(12) United States Patent
Oostwouder et al.

(10) Patent No.: US 6,266,862 B1
(45) Date of Patent: *Jul. 31, 2001

(54) WELD SEAM OPENING REGULATOR FOR CYLINDRICAL TANK BUILDING PROCESS

(75) Inventors: Arie Oostwouder, Anna Paulowna; Jon Piet Oostwouder, Oudesluis, both of (NL)

(73) Assignee: Chicago Bridge & Iron Company, Plainfield, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/818,613

(22) Filed: Mar. 14, 1997

(51) Int. Cl.⁷ ............................................. B25B 27/14
(52) U.S. Cl. ................ 29/281.4; 29/429; 29/281.6; 29/281.1; 29/466; 228/49.1; 228/49.4
(58) Field of Search .............. 29/281.1, 281.4, 29/281.5, 281.6, 429, 466, 468, 559; 228/25, 29, 47.1, 48, 49.1, 49.4

(56) References Cited

U.S. PATENT DOCUMENTS

| | | |
|---|---|---|
| 2,143,969 | 1/1939 | Biggert, Jr. . |
| 2,704,913 | 3/1955 | Soderlund . |
| 3,206,899 * | 9/1965 | Wright . |
| 3,212,184 | 10/1965 | Bennewitz et al. . |
| 3,245,176 | 4/1966 | Muehling . |
| 3,337,384 | 8/1967 | Wright . |
| 3,474,514 * | 10/1969 | Lombardi .................... 29/429 X |
| 3,838,496 | 10/1974 | Kelly . |
| 3,966,533 | 6/1976 | Goldsworthy et al. . |
| 4,067,097 * | 1/1978 | Okamoto ........................ 29/429 |
| 4,074,847 | 2/1978 | McFatter . |
| 4,121,384 | 10/1978 | Harmant . |
| 4,121,747 | 10/1978 | McFatter . |
| 4,142,284 | 3/1979 | Steuber . |
| 4,266,373 | 5/1981 | Bornefeld et al. . |
| 4,326,398 | 4/1982 | Begue . |
| 4,476,370 | 10/1984 | Kakihara . |
| 4,494,291 | 1/1985 | Morrison . |
| 4,587,698 | 5/1986 | Bonner et al. . |
| 4,618,757 | 10/1986 | Cabany et al. . |
| 5,737,832 * | 4/1998 | Bubb .............................. 29/781 |

FOREIGN PATENT DOCUMENTS

833466 * 4/1960 (GB) ................................ 29/429

* cited by examiner

Primary Examiner—P. W. Echols
(74) Attorney, Agent, or Firm—Marshall, O'Toole, Gerstein, Murray & Borun

(57) ABSTRACT

A weld seam opening regulator for use in constricting cylindrical structures, including a frame, first and second wheels for riding on a first edge of a band of metal, a third wheel for riding on a first edge of a cylindrical portion of the structure, and a fourth wheel for riding on an inner surface of the cylindrical portion and maintaining a minimum weld spacing between the band and cylinder. Also, an adjustable bottom roller rides on a second edge of the metal band urges the metal band toward the cylindrical portion of the structure.

8 Claims, 7 Drawing Sheets

WELD SEAM OPENING REGULATOR FOR CYLINDRICAL TANK BUILDING PROCESS

FIELD AND BACKGROUND OF THE INVENTION

This invention relates generally to methods and apparatus for building cylindrical tanks using coils of metal, such as steel, and more particularly to a weld seam opening regulator that aligns and spaces a metal band from a coil with a portion of a cylindrical tank prior to the two being welded together. The methods and apparatus enhance weld quality and uniformity, and are readily adaptable to automatic weld seam opening adjustment.

Coil steel tank building processes are known from various sources such as Oostwouder European Publication No. 282 126, wherein a cylindrical tank is built from coiled sheets of stainless steel. Cylindrical tank portions or rings are made by unwinding a band of steel from a coil, passing it over rollers spaced to the desired tank diameter, cut to length, and welded at its ends to form a cylindrical ring. The ring is then raised up with jacks, aligned with a second band of steel from the coil, and the two are welded together along a horizontal weld seam. This process is repeated until a desired tank height is achieved. Preferably, a welding station for joining the two component parts remains stationary and the ring and band of coil steel are rotated so that the point of merger between the band of coil steel and the ring also remains stationary near the welding station.

Originally, the cylindrical portion of the tank and the band of coil steel were aligned by a system of rollers, such as items 24 and 25 of FIG. 1 in European Publication '126. One pair of rollers was positioned inside the cylindrical structure and one pair of rollers was positioned outside of the band of coil steel. By varying the angle between the pairs of rollers and the spacing of the rollers, the band of coil steel was aligned with the cylindrical tank portion. Vertical forces from supporting rollers were applied to vary the spacing of the steel band and the cylindrical structure. Due to variations in steel surfaces and thicknesses, the forces applied by the rollers vary and result in variations in the vertical and horizontal spacings of the steel band and the cylindrical tank portion. These variations reduce welding efficiency and reliability of a full penetration welded joint between the cylindrical tank portions.

Another example of a cylindrical tank building method is disclosed in U.S. Pat. No. 4,494,291 wherein apparatus for constructing cylindrical storage tanks and a fitting frame 15 are described. A band of steel is supported by support and guide rollers 116 and 117. A push-down roller 132 and a push-out roller 125 aid in alignment. The fitting frame 15 is not stationary and it rotates around the tank on wheels with the coil steel. Further, vertical spacing between the band of steel and the upper cylindrical portion is controlled without the benefit of a lower roller that provides a reaction force and surface from which weld seam spacing can be set. The spacing is set by visual adjustment by an experienced operator and apparently requires constant adjustment as the fitting frame travels around in circles on uneven ground.

Next, U.S. Pat. Nos. 4,121,747; 4,047,847; and 4,142,284 disclose a welded storage tank construction method in which the steel strips are welded into a spiral to form a tank. There is no single device that bears on both the steel band and the already formed upper cylindrical portion to align the two and there is no disclosure of a device that aligns a steel band with an upper cylindrical portion and also sets the vertical weld seam opening dimension.

U.S. Pat. No. 4,618,757 discloses a method for making a cylindrical tank by unwinding a band of steel into alignment with a previously made upper cylindrical portion. Rollers 33 are used to align the band with the upper cylindrical portion, but the rollers have no ability to adjust the vertical weld seam opening dimension.

U.S. Pat. Nos. 3,337,384 and 3,206,899 disclose an apparatus for making walled structures. The device in these patents rotates about an axis to add strips of material onto the structure from the ground up. The apparatus includes lateral guide rollers 90 and 92 and small rollers 102 and 103 to "prevent the previously sealed wall and the feed strip from prematurely contacting the surface of the heater plate 82, thus assuring more uniform heating of the sealing surfaces." (Col. 5, lines 13 to 16.) Although the rollers 102 and 103 do provide some vertical spacing prior to the layers being fused together, they are not capable of maintaining the two layers in a spaced relationship to accept a downstream weld.

Finally, U.S. Pat. No. 3,838,496 discloses a welding machine that rides on top of sheets of steel as they are added to a tank. Numerous stabilizing rollers are used to align parts to be welded.

Thus, there is a need in these cylindrical tank building methods for a simple weld seam opening regulator and regulating method that can align a band of steel with an existing cylindrical tank portion to achieve constant spacing at a welding station for improved welding efficiency and uniformity. Further, it is desirable that such regulator apparatus and methods be automatically adjustable for improved tank building efficiency and convenience.

SUMMARY OF THE INVENTION

Figure 1:
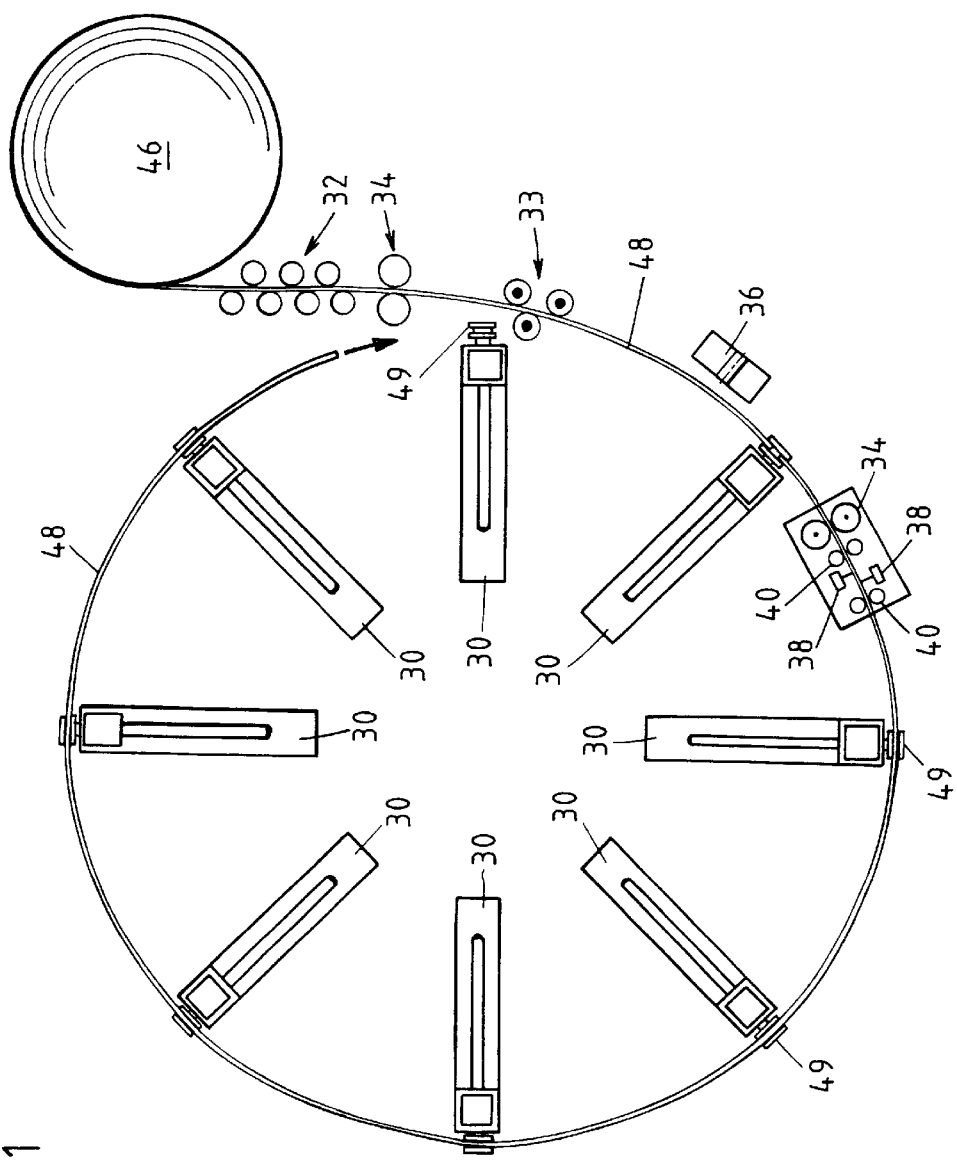
FIG. 1 is a schematic plan view of a cylindrical tank building apparatus.

The present invention provides a mechanism for consistent and accurate weld opening with easily adjusted parts. The invention may include apparatus for defining a weld seam opening between a cylindrical tank portion and a band of coil metal, the cylindrical tank portion includes an inner surface and a first edge, and the band of coil metal includes a first edge, a second edge, and an outer surface, the apparatus comprising: a frame having first and second sides; first and second wheels rotatably joined to the first side of the frame for rotation about spaced apart first and second horizontal axes, each wheel having an outer annular surface engageable with the first edge of the band of coil metal and a radially extending flange engageable with the outer surface of the band of coil metal; a third wheel rotatably joined to the second side of the frame for rotation about a horizontal axis, having an outer annular bearing surface engageable with the first edge of the cylindrical tank portion to maintain a vertical weld seam opening between the first edge of the cylindrical tank portion and the first edge of the band of coil metal; and a fourth wheel rotatably joined to the second side of the frame for rotation about a vertical axis and having an outer peripheral bearing surface engageable with the inner surface of the cylindrical tank portion to act in concert with the first and second wheel radial flanges to maintain horizontal weld seam alignment of the cylindrical tank portion and the band of coil metal.

The apparatus may further include means for adjusting the vertical spacing between the first edge of the cylindrical tank portion and the first edge of the band of coil metal which itself may include a vertically adjustable horizontal axis for rotatably joining the third wheel to the second side of the frame.

The apparatus may further include horizontal adjustment means for adjusting the horizontal alignment of the cylindrical tank portion and the band of coil metal, wherein the horizontal adjustment means may include a horizontally adjustable vertical axis for rotatably joining the fourth wheel to the second side of the frame.

The apparatus may include weld seam opening measuring means for detecting variations in the weld seam opening; and motorized wheel spacing adjustment means for adjusting a vertical position of the third wheel relative to a vertical position of the first and second wheels in response to variations in the weld seam opening.

The apparatus may further include weld seam measuring means for detecting variations in the weld seam opening; a motorized wheel spacing adjustment means for adjusting a vertical spacing between the first and second wheels and the third wheel in response to variations in the weld seam opening; and a motorized wheel spacing adjustment means for adjusting a horizontal spacing between the fourth wheel and the first and second wheel flanges.

The apparatus preferably includes a bottom adjustable roller having an outer annular surface for supporting a bottom edge of a metal band which may itself include a pair of spaced apart guide rollers between which the bottom adjustable roller is disposed.

The invention is also directed to a method for defining a weld seam opening between a cylindrical tank portion having a first edge and an inner surface, and a band of coil metal having a first edge, second edge, and an outer surface, comprising the steps of: rotating the cylindrical tank portion; unwinding the metal band; placing first and second rotatable and flanged wheels of a weld seam opening regulator on the first edge of the metal band; placing a third rotatable wheel of the weld seam opening regulator on the first edge of the cylindrical tank portion to define a vertical weld seam opening between the first edge of the cylindrical tank portion and the first edge of the band of coil steel; and placing a fourth rotatable wheel of the weld seam opening regulator on the inner surface of the cylindrical tank portion to draw the flanges of the first and second wheels into contact with the outer surface of the band of coil metal and position the weld seam opening regulator near the intersection of the cylindrical tank and the band of coil steel.

DETAILED DESCRIPTION OF THE DRAWINGS

To the extent reasonable and practical, the same reference numerals will be used in each of the figures discussed below. Methods and apparatus for constructing a cylindrical metal building are disclosed in European Publication No. 282 126 B1 to Oostwouder, which is incorporated herein by reference.

In FIG. 1 there is depicted apparatus for constructing a cylindrical tank, silo, or other building from coils of metal such as stainless steel. The apparatus includes a series of radially extending lifting units 30, a stretching unit 32, a rolling machine 33, a pair of driving units 34, a cutting device 36, a welding device 38, and guiding rolls 40. During construction of a cylindrical metal building such as a tank, a coil of metal 46 is positioned adjacent the lifting units 30 as illustrated in FIG. 1. A metal band 48 is removed from the coil 46 and a vertical orientation is first shaped to the desired arcuate shape by the stretching unit 32 and the rolling machine 33. During the shaping of the metal band 48, all of the lifting units 30 are in their lowermost position. The end of the metal band 48 that has passed through the rolling machine 33 is moved in a clockwise direction by means of the drive unit 34 and is successively moved over the lifting units 30 by use of flanged rollers 49.

After the metal band 48 has been moved around the lifting units 30 by the driving units 34, the cutting device 36 cuts the metal band to a length that corresponds to the circumference of a cylindrical section 50, as desired. The beginning and the end of the metal band 48 are welded to one another to form a complete ring or cylindrical section 50 (FIGS. 2 and 3).

After the first cylindrical section 50 has been formed, the lifting units 30 are synchronously moved upwards a distance equal to the width of a metal band 48. The coil 46 is then unwound to provide a second metal band 48 which is fed through the stretching unit 32, the rolling machine 33, and the driving units 34 as before. When the forward end of the metal band 48 reaches the vicinity of the cylindrical section 50 the two are aligned so that an upper edge 54 of the metal band 48 is positioned vertically and horizontally adjacent to a lower edge 56 of the cylindrical section 50. Both the cylindrical section 50 and metal band 48 are rotated at identical speeds so that the metal band upper edge 54 remains adjacent to the cylindrical section lower edge 56 as the two rotate into the welding device 38 where they are welded together to form a cylindrical section equal in depth to two widths of metal bands 48.

Figure 2:
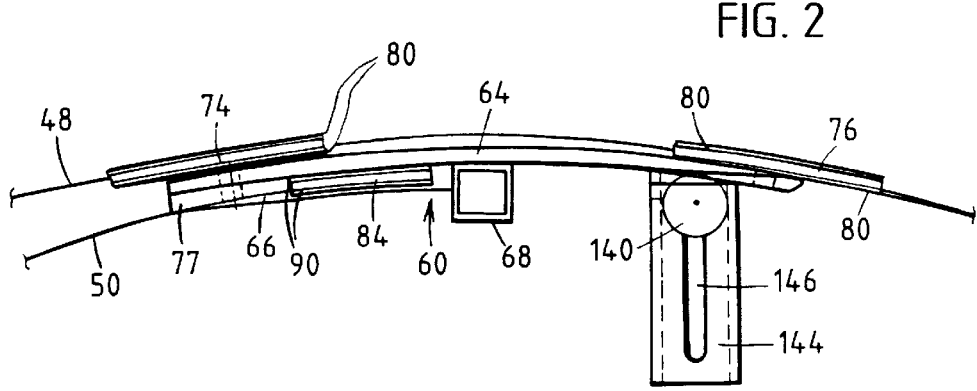
FIG. 2 is a partial plan view of a point of merger between a band of coil metal and a cylindrical tank portion.
Figure 3:
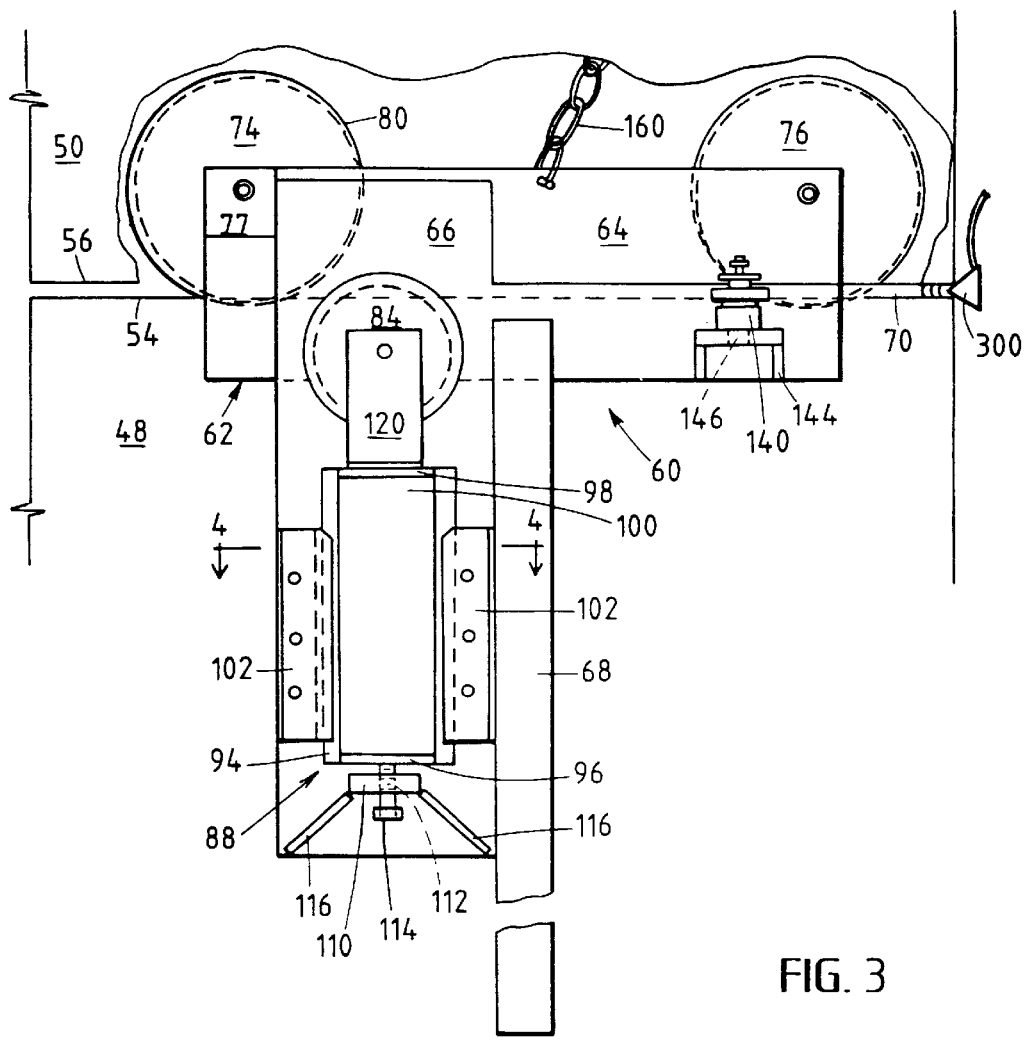
FIG. 3 is an elevational view of a weld seam opening regulator in accordance with the present invention.

Referring now to FIGS. 2 and 3, there is depicted a plan view of the junction between the metal band 48 and the cylindrical section 50 which is roughly v-shaped. At the junction of the metal band 48 and the cylindrical section 50, a weld seam opening regulator 60 is depicted, which aligns the metal band 48 and the cylindrical section 50 so that the upper edge 54 of the metal band 48 and the lower edge 56 of the cylindrical section are aligned both horizontally and vertically in preparation for the welding device 38 to weld the two edges together.

As illustrated in FIG. 3, the weld seam regulator 60 includes a frame 62 comprising a horizontal plate 64 welded to a vertical plate 66. The frame 62 is supported by a square tube frame stand 68. The horizontal plate 64, as seen in FIG. 2, includes an arcuate shape of about the same radius as the tank structure to be built, although it is not necessary that the horizontal plate 64 be bent to the exact radius of the tank. The vertical plate 66 can be flat and welded to the horizontal plate 64 as illustrated in FIG. 3. The stand frame 68 is welded to both the horizontal plate 64 and the vertical plate 66 and can be any suitable shape to maintain the frame 62 in a fixed location.

A vertical gap between the metal band upper edge 54 and cylindrical section lower edge 56 defines the desired weld seam opening 70 for an appropriate weld, such as a full penetration weld. To maintain a proper and consistent weld seam opening 70, a first wheel 74 and a second wheel 76 are rotatably joined to the back side of the horizontal plate 64. A pair of flanges 80 define a recess adapted to receive the upper edge 54 of the metal band 48. The first wheel 74 is also reinforced by a small square plate 77 because the first wheel 74 applies a high stress to the frame 62 as the metal band 48 is drawn into alignment with the cylindrical section 50.

A third wheel 84 is rotatably joined to a front side of the vertical plate 66 via an adjustment mechanism 88 to be described in detail below. The third wheel has at its outer annular perimeter a pair of spaced flanges 90 that define a recess adapted to receive the lower edge 56 of the cylindrical section 50. The flanges of all the wheels are of an adequate thickness to keep the wheels from jumping off the metal band 48 and the cylindrical portion 50 as they are drawn into alignment. Further, the wheel flanges and their respective recesses are preferably hardened with chrome plating to withstand the stress and abrasion of various building materials such as stainless steel. The vertical dimension between the third wheel 84 recess and the recesses of the first and second wheels 74 and 76 defines vertical weld seam opening 70.

Figure 4:
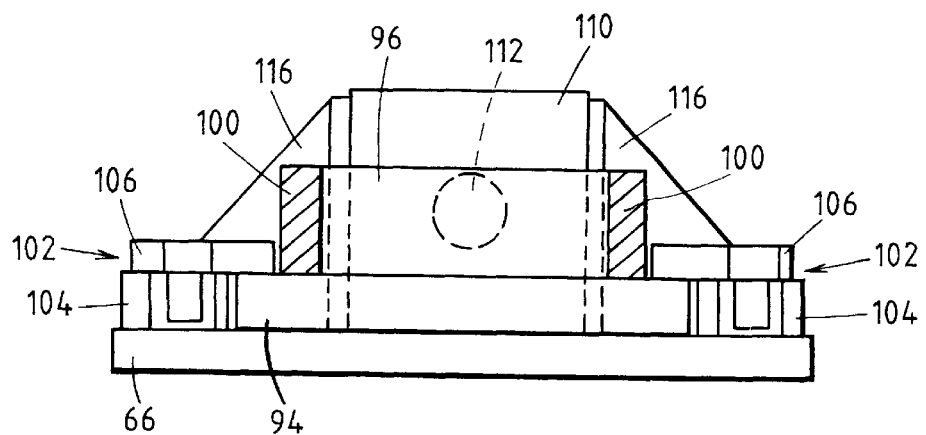
FIG. 4 is a cross-sectional view of the weld seam opening regulator taken along line 4—4 in FIG. 3.
Figure 5:
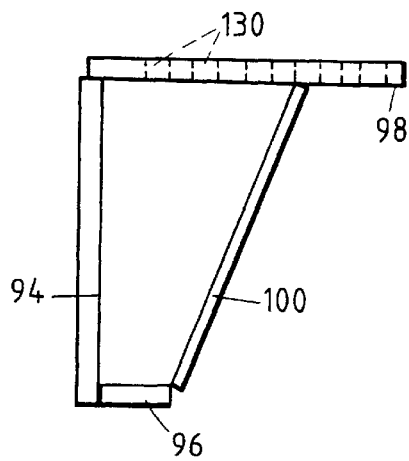
FIG. 5 is a side elevational view of a roller support bracket.
Figure 6:
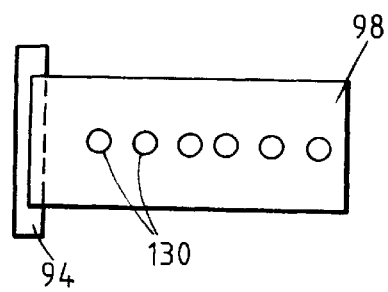
FIG. 6 is a plan view of the roller support bracket of FIG. 5.

As illustrated in FIGS. 3 to 6, the vertical adjustment mechanism 88 includes a vertical sliding plate 94, a bottom screw bearing plate 96, an upper horizontal support plate 98, and a reinforcing bracket 100. The vertical sliding plate 94 is slideably engaged to the vertical plate 66 via channels 102 which are mounted on the vertical plate 66. As illustrated in FIG. 4, the channels 102 are defined by a first plate 104 which is welded to the vertical plate 66 and a wider second plate 106 bolted to the first plate 104 as depicted in FIG. 5. The thickness of the first plate 104 is only slightly greater then the thickness of the vertical sliding plate 94 so that the vertical sliding plate 94 can be received between the channels 102 for sliding movement without the possibility of falling away from the frame 62. Beneath the bottom screw bearing plate 96, there is welded to the vertical plate 66 of the frame 62, a horizontal screw adjustment plate 110 which defines therethrough a threaded hole 112 through which a screw 114 (FIG. 3) is rotatably disposed. The screw 114 extends upwardly through the hole and is in bearing contact with the bottom screw bearing plate 96 in a manner that causes the vertical adjustment mechanism 88 to be raised and lowered as the screw 114 is rotated clockwise and counterclockwise, respectively. The horizontal screw adjustment plate 110 is reinforced with a pair of angularly disposed support plates 116 which are all welded together to provide adequate support for the vertical adjustment mechanism 88.

Figure 7:
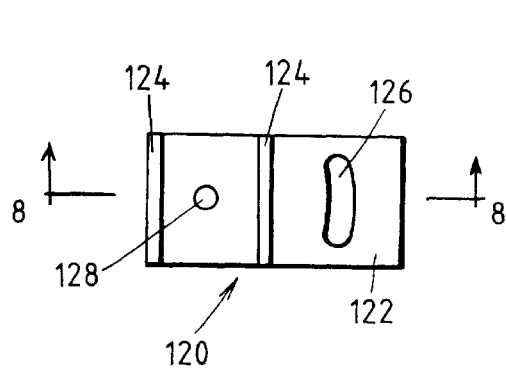
FIG. 7 is a plan view of the roller adjustment bracket.
Figure 8:
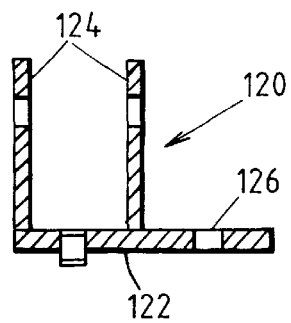
FIG. 8 is a sectional view of a roller adjustment bracket taken along line 8—8 in FIG. 7.

The vertical adjustment mechanism 88 further includes a horizontal adjustment bracket 120 best depicted in FIGS. 7 and 8 which includes a horizontal plate 122 and two spaced apart vertical plates 124. The horizontal plate includes a single arcuate bolt slot 126 and a downwardly extending peg 128 which are both adapted to be aligned with mating holes 130 in the upper horizontal support plate 98 of the vertical adjustment mechanism 88. To adjust the position of the horizontal adjustment bracket 120, the peg 128 is inserted into one of the holes 130 in the upper horizontal support plate 98 and a bolt (not depicted) is inserted through the arcuate bolt slot 126 and another hole 130 in the upper horizontal support 98 to secure the horizontal adjustment bracket 120 at the proper horizontal distance from the frame 62. The third wheel 84 is then rotatably mounted between the two vertical plates 124 on an appropriate bearing that is secure to the vertical plates 124 through holes 132. The horizontal adjustment bracket 120 can then be pivoted somewhat due to the arcuate bolt slot 126 to properly align the flanged portion 90 of the third wheel 84 with the lower edge 56 of the cylindrical section 50.

Referring back to FIGS. 2 and 3, a fourth wheel 140 is also adjustably mounted on the front side of the horizontal plate 64 of the frame 62. The fourth wheel 140 is mounted on an inwardly extending channel-shaped bracket 144 that may be built up from three plates as illustrated or from a single channel-shaped rolled section. The channel-shaped bracket 144 defines a horizontal slot 146 through which the fourth wheel 140 can be rotatably mounted and adjusted inwardly and outwardly from the frame 62 as needed to adjust for different tank diameters. The fourth wheel 140 has an outer annular surface that bears on the inner surface of the cylindrical section 50 to keep the weld seam opening regulator positioned near the intersection of the cylindrical section 50 and the coil metal band 48.

To prevent the frame 62 from tipping or moving forward with the advancing coil metal band 48, a chain 160 may be provided at the upper end of the frame 62 and secured to another stationary construction frame (not illustrated).

Thus, the weld seam regulator 60 is operated by positioning the third wheel 84 under the cylindrical section lower edge 56. The metal band tipper edge 54 is then positioned under the first and second wheels 74 and 76 so that as the metal band 48 and the cylindrical section 50 rotate through the stationary weld seam opening regulator 60, the vertical spacing of the weld seam opening 70 will be defined by the first and second wheels 74 and 76 in conjunction with the third wheel 84. The fourth wheel 140 bearing on the inner surface of the cylindrical section 50 keeps the weld seam opening regulator 60 positioned near the intersection of the cylindrical portion 50 and the coil metal band 48. The vertical and horizontal spacing defined by these various wheel spacings on the weld seam opening regulator 60 prevent the weld seam opening 70 from closing beyond a minimum required weld dimension and help to provide a consistent and known spacing into which a full seam weld can be deposited for accurate and consistent welding of the metal band 48 to the upper cylindrical section 50.

Figure 9:
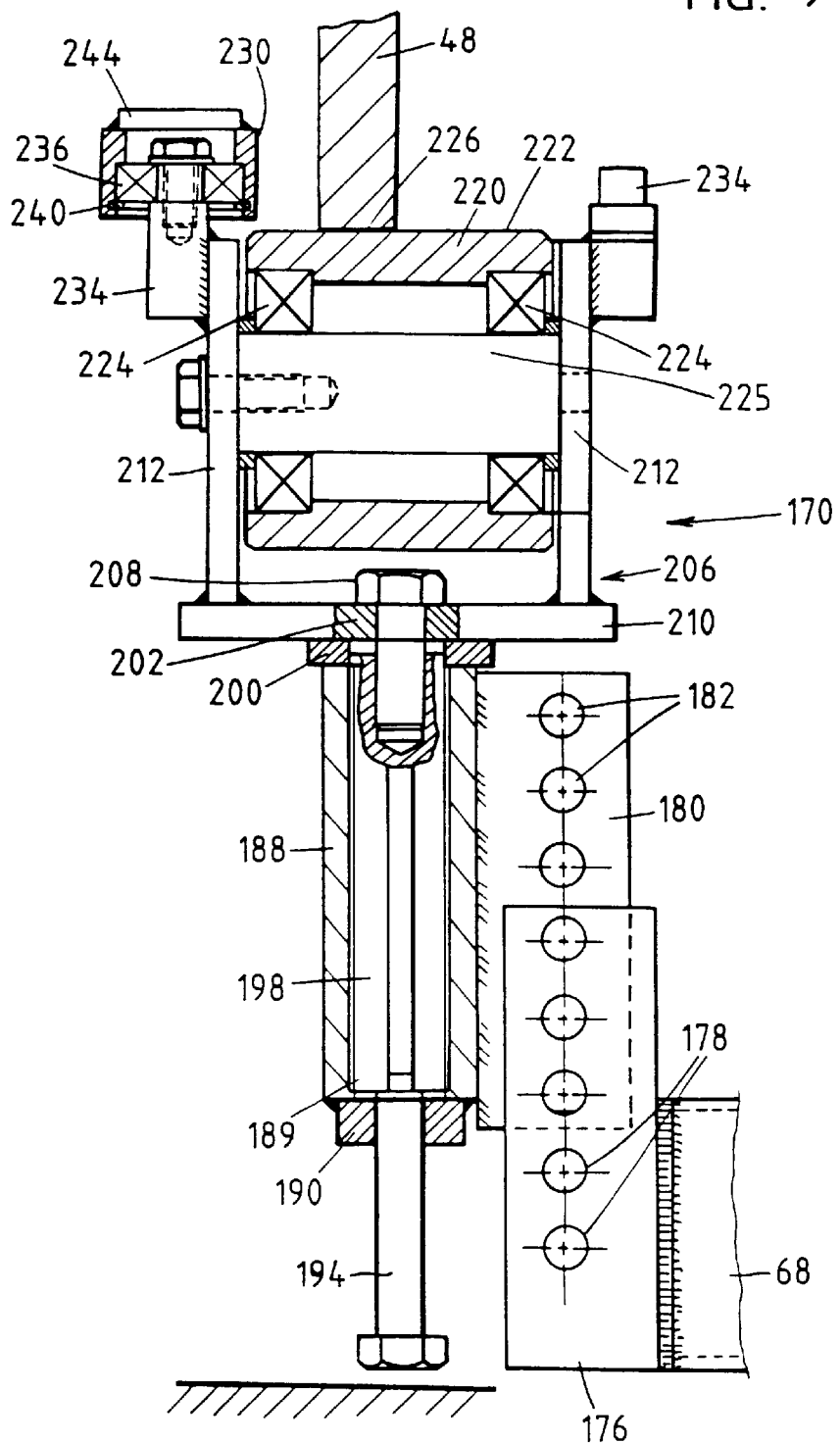
FIG. 9 is an elevational view of a bottom adjustable roller.
Figure 10:
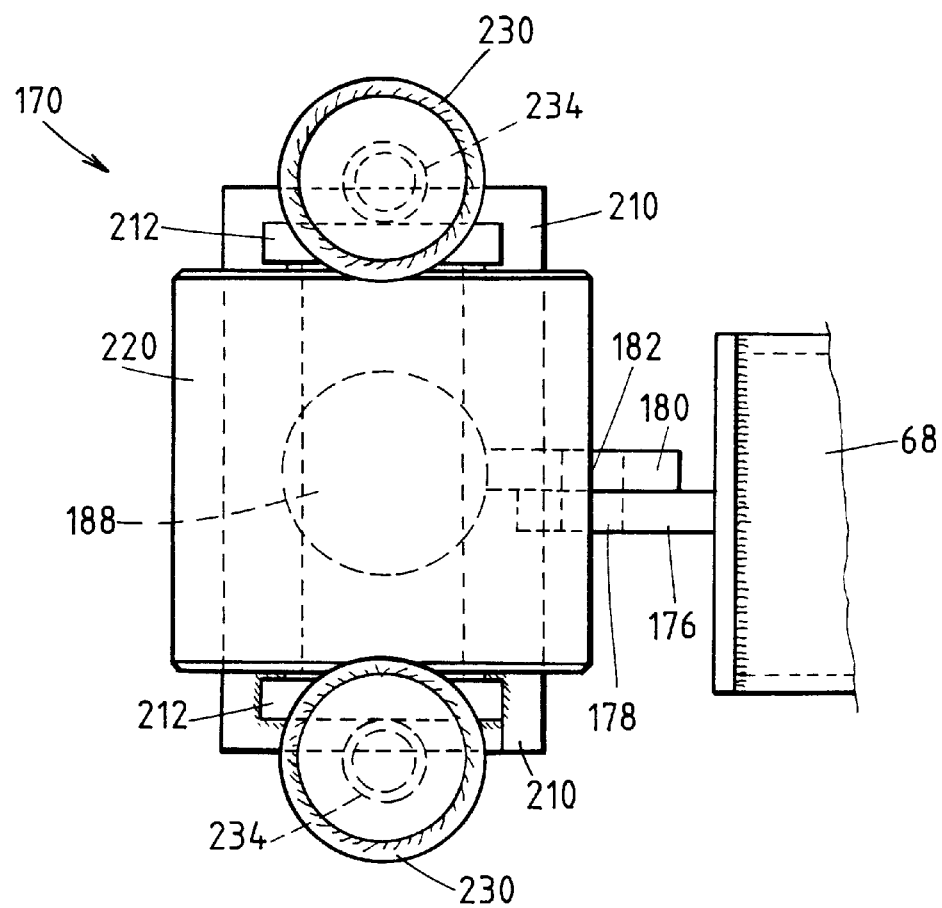
FIG. 10 is a plan view of the bottom adjustable roller.

As described above, the cylindrical section 50 is supported by lifting units 30 as a new metal band 48 is welded to the lower edge 56 of the cylindrical section 50. The cylindrical section and the metal band 48 will be supported by the lifting units 30 when the two are welded together. An adjustable bottom roller 170, (as depicted in FIGS. 9 and 10), provides support directly beneath the weld seam opening regulator 60 and ensures that the weld seam opening 70 maintains a maximum opening size. The bottom adjustable roller 170 can be joined to the frame stand 68 of the weld seam opening regulator 60 or to a separate ground mounted frame. A vertical fixed bracket 176 is welded to the ground mounted frame 68 and includes a series of five holes 178 as illustrated. A vertical plate 180 having mating holes 182 can be bolted to the fixed bracket 176 at any of several relative elevations. Welded to the matting vertical plate 180, is a cylindrical sleeve 188 defining a vertical bore therethrough.

At the bottom of the sleeve 188 there is an inwardly tapered shoulder 189 to which a horizontal plate 190 is welded. The horizontal plate 190 has a threaded hole through which a bolt 194 extends. A spline 198 is disposed in the bore of the sleeve 188 and bears on the top of the bolt 194 so that as the bolt 194 is rotated clockwise and counterclockwise, the spline 198 will be raised and lowered, respectively. The spline 198 may be prevented from bearing on the horizontal plate 190 by the tapered shoulder 189. At the top of the spline 198 there is a second horizontal plate 200 which has a hole through which a screw 208 extends.

A bottom adjustable roller frame 206 is secured to the spline 198 by a screw 208, as depicted. The bottom adjustable roller frame 206 includes a bottom horizontal plate 210 and a pair of upwardly extending vertical support plates 212. The bottom adjustable roller frame 206 is raised and lowered as the spline 198 is raised and lowered by the bolt 194. The vertical support plates 212 are spaced apart as shown to define a space in which the bottom adjustable roller 220 is disposed and rotatable mounted.

The bottom adjustable roller 220 includes an outer annular surface 222, a pair of bearings 224, and an inner axis 225. A bottom edge 226 of the metal band 48 bears on the outer annular surface 222 which is preferably chrome hardened. To prevent the bottom edge 226 of the metal band 48 from slipping off of the bottom adjustable roller 220, there are provided a pair of spaced apart guide rollers 230 mounted on a vertical axis for horizontal rotation should they contact the metal band 48.

The guide rollers 230 are joined to the bottom adjustable roller frame 206 by machined rod sections 234 welded to the bottom adjustable roller frame 206. On top of each rod section 234, there is a roller bearing 236 which is screwed to the rod section with a screw 238. The roller bearing 236 is maintained within the guide roller 230 by a snap ring 240. On top of the guide rollers 230 there is a horizontal disk 244 welded to the guide rollers 230 to keep the bearings clean and prevent material from restricting the movement of the guide rollers 230. Bottom roller 220 provides uplift when needed to close the weld opening 70, as bottom roller 220 is lifted, weld seam opening regulator 60 must be adjusted to allow the seam opening 70 to close. Likewise, to open the weld opening 70, the bottom adjustable roller 220 is adjusted down and the weld seam opening regulator 60 is opened to push the weld seam 70 open.

Figure 11:
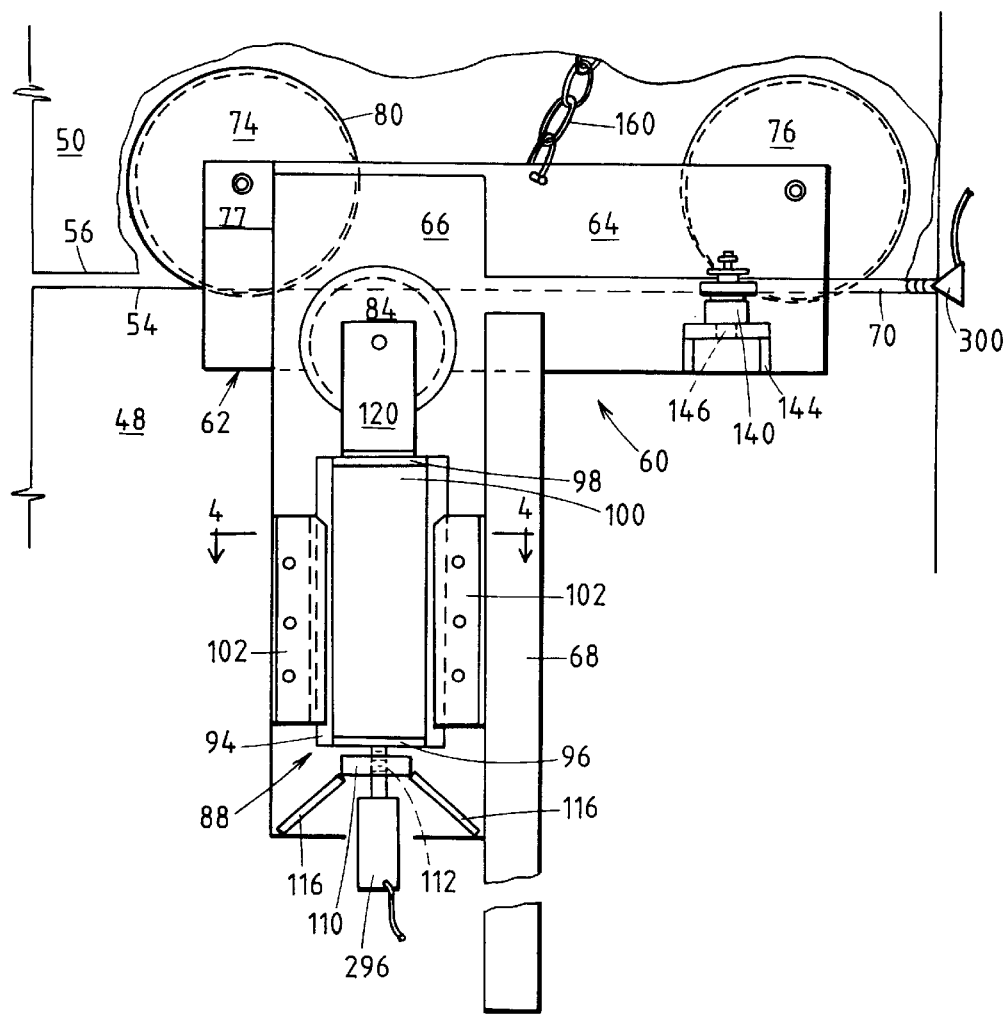
FIG. 11 is an elevational view of an alternative embodiment of a weld seam regulator in accordance with the present invention.
Figure 12:
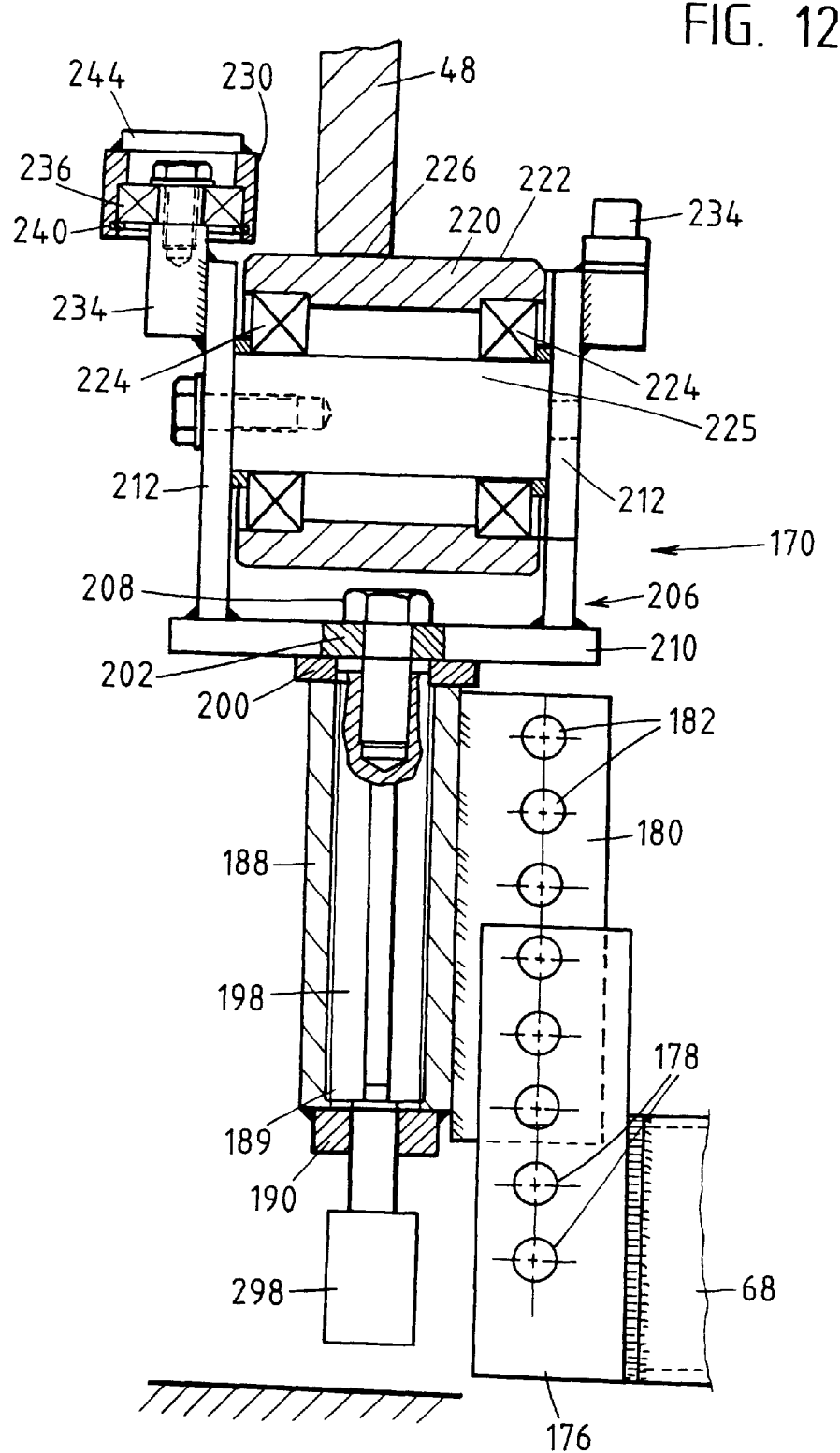
FIG. 12 is an elevational view of an alternative embodiment of a buttom adjustable roller.

As depicted in FIGS. 11 and 12, the adjustment screws for all of the wheel adjustment brackets and frames can be automatically adjusted using appropriate low speed, bidirectional motors 296 (FIG. 11) and 298 (FIG. 12) to actuate the adjusting screws. The control for these motors can be individually controlled or linked to a control panel for adjustment by the welding operator without the need to leave the weld station or stop the forming process. Preferably, all of the motors are automatically activated to adjust the wheels depending upon variations in the weld seam opening, as detected by a sensor 300 (FIG. 11) which can be a light beam or photocell so that the sensor 300 output can be used by an operator or a microprocessor to adjust the weld seam opening.

The foregoing detailed description of drawings has been provided for clearness of understanding only and no unnecessary limitations therefrom should be read into the following claims.

What is claimed is:

1. An apparatus for defining a weld seam opening between a lower edge of an existing portion of a cylindrical tank and an upper edge of a band used to form a new portion of the tank, the apparatus comprising:

a frame;

first and second wheels rotatably joined to the frame for rotation about respective spaced-apart first and second horizontal axes, wherein each of the wheels comprises:

(i) a circumferential bearing surface, wherein a first line corresponding to the upper edge of the band is tangent to each of the bearing surfaces; and (ii) a radial flange extending beyond and flanking said circumferential bearing surface, wherein the flange constitutes a limit to horizontal movement of the band relative to the frame along the axial direction of the wheel;

a third wheel rotatably joined to the frame for rotation about a third horizontal axis that is laterally between the first and second axes, the third wheel comprising a third circumferential bearing surface with a second line corresponding to the lower edge of the existing portion of the tank being tangent to the third bearing surface and being located above the first line; and a fourth wheel rotatably joined to the frame for rotation about a vertical axis, the fourth wheel comprising a fourth circumferential bearing surface with a substantially horizontal line being tangent to the fourth bearing surface and being located below the first line, wherein the fourth bearing surface biases the band relative to the frame.

2. The apparatus of claim 1, and further comprising:

means for adjusting the vertical spacing between the first line and the second line.

3. The apparatus of claim 2 wherein the vertical adjustment means comprises:

means for vertically adjusting the axis of the third wheel.

4. The apparatus of claim 1, and further comprising:

horizontal adjustment means for adjusting the horizontal position of the fourth wheel.

5. The apparatus of claim 4 wherein the horizontal adjustment means comprises:

means for horizontally adjusting the axis of the fourth wheel.

6. The apparatus of claim 1, and further comprising a bottom adjustable roller having an outer surface comprising means for supporting the lower edge of the existing portion of the tank.

7. The apparatus of claim 6, and further comprising:

a pair of spaced apart guide rollers between which the bottom adjustable roller is disposed.

8. The apparatus of claim 1, in which the distance between the first and second lines is approximately equal to the width of the weld seam opening.

* * * * *